May 26, 1959     H. W. VAN NESS     2,888,550
ELECTRIC DISCHARGE APPARATUS
Filed Dec. 13, 1955     4 Sheets-Sheet 2

Resistance in Ohms
Capacitance in Microfarads
v = Volts
k = 1000

2,888,550
ELECTRIC DISCHARGE APPARATUS

Hubert W. Van Ness, Diablo, Calif., assignor to Westinghouse Electric Corporation, East Pittsburgh, Pa., a corporation of Pennsylvania Application December 13, 1955, Serial No. 552,825

14 Claims. (Cl. 219—114)

This invention relates to electric discharge apparatus and has particular relationship to control apparatus for electric resistance welding. This application is a continuation-in-part of a Patent 2,802,146, granted August 6, 1957, to Hubert W. Van Ness (herein called Van Ness patent) and relates to another Patent 2,840,686, granted June 24, 1958, to Hubert W. Van Ness and William E. Large (herein called Large patent). Both the Van Ness and the Large patents are incorporated herein by reference.

The Van Ness patent discloses apparatus for controlling the supply of current from an alternating current source to a welding transformer particularly of the highly magnetizable type. This apparatus includes facilities for assuring that during each welding interval the flow of current during the first half period of the interval is initiated late in the half period so as to avoid saturation of the welding transformer. The Large patent discloses a sequence timer for high speed welding including provisions for interposing a fixed delay between the start of the weld interval and the actual flow of welding current and another usually equal delay between the start of the hold interval and termination of the flow of welding current. In this way so-called negative hold is produced, and the orderly progress of the welding cycle is not affected by the sluggishness of the mechanisms for engaging and disengaging the welding electrodes from the work. The apparatus disclosed in the Van Ness and Large patents has in practice been found to operate highly satisfactorily, but it is complex in structure and in operation. Further, in situations in which a welding machine or welder having a highly magnetizable core is to be operated at a high speed, both the negative hold and the late initiation of the welding current during the first half period of a welding interval must be incorporated in the apparatus, and, thus, complex features of entirely different structures, one disclosed in the Van Ness patent and the other in the Large patent, must be included in the apparatus. This multiplies the complexity.

It is accordingly a broad object of this invention to provide apparatus of simple structure for controlling the supply of current to a welding transformer of the high magnetizable type.

Another object of this invention is to provide apparatus of simple srtucture including the negative hold feature which is particularly for high speed welding.

A further object of this invention is to provide apparatus of simple structure for controlling the supply of current to a high speed welder of the type including a highly magnetizable welding transformer.

An ancillary object of this invention is to provide novel electronic circuits particularly suitable for use in welding apparatus of the general type disclosed in the Van Ness and Large patents.

In one of its specific aspects, this invention is applied to welding apparatus including a heat control network which includes an electric discharge device that is connected in the network to condition the network to supply a series or train of heat control pulses, each pulse beginning at a predetermined instant in a half period of an alternating current supply. The discharge device is so connected in this heat control network that the first of any series of these pulses is supplied no earlier than the instant when the conditioning discharge device is rendered conducting. The discharge device is so controlled that at the beginning of a welding interval, it is rendered conducting late in the first half period of the welding interval as, for example, at an instant one quarter period after the beginning of the first half period. Thus, the first of the series of pulses is initiated late in the first half period of the interval.

The heat control pulses are supplied to initiate the flow of welding current through the welding transformer. Each pulse initiates a half cycle of welding current about the instant when it starts to flow. Thus, a series of welding current half cycles are initiated, the first being initiated at an instant late in the first half period.

In accordance with another specific aspect of this invention a negative hold network is interposed between the sequence timer which times a welding operation and the heat control network. This negative hold network is controlled from the discharge device of the sequence timer which supplies current during the weld interval. The control circuit of the negative hold network is similar to the above-described control circuit of the discharge device which conditions the heat control network to supply pulses. The negative hold network thus introduces a delay between the beginning and end of the weld interval timed by the sequence timer and the initiation and termination of the welding current. The timing of the hold interval of the sequence timer is initiated in the normal course of operation of the sequence timer, and the hold time may start during the delay so that the electrode actuating mechanism starts to operate while welding current is still flowing.

The improvement in structure and operation of the apparatus in accordance with this invention, is achieved by applying a novel electronic circuit both to achieve the delay in the initiation of the welding current during the first half period of a welding interval and to achieve the delay between the initiation of the welding current and the initiation of the weld interval of the sequence timer. This novel circuit includes an electric discharge device, preferably a thyratron, and a pair of time-constant networks which are connected in a charging network in series with an alternating current supply and a rectifier. One of these time-constant networks is connected between the control electrode and the cathode of the discharge device, and the rectifier is so poled and the impedances of the time-constant networks are so related that when current flows in the charging network a blocking potential is impressed on the discharge device. The flow of charging current in the charging network may be blocked by impressing a potential across the other time-constant network. This potential may, for example, be impressed by the current derived from the sequence timer during the weld interval. When the flow of current through the charging network is blocked, the network in the control circuit of the discharge device discharges, and after it has discharged, it permits the discharge device to conduct. The time required for the network in the control circuit of the discharge device to discharge may be set so that the desired delay, whether it be the delay in the conduction of welding current during the first half period or the negative hold delay, is achieved.

Figure 5:
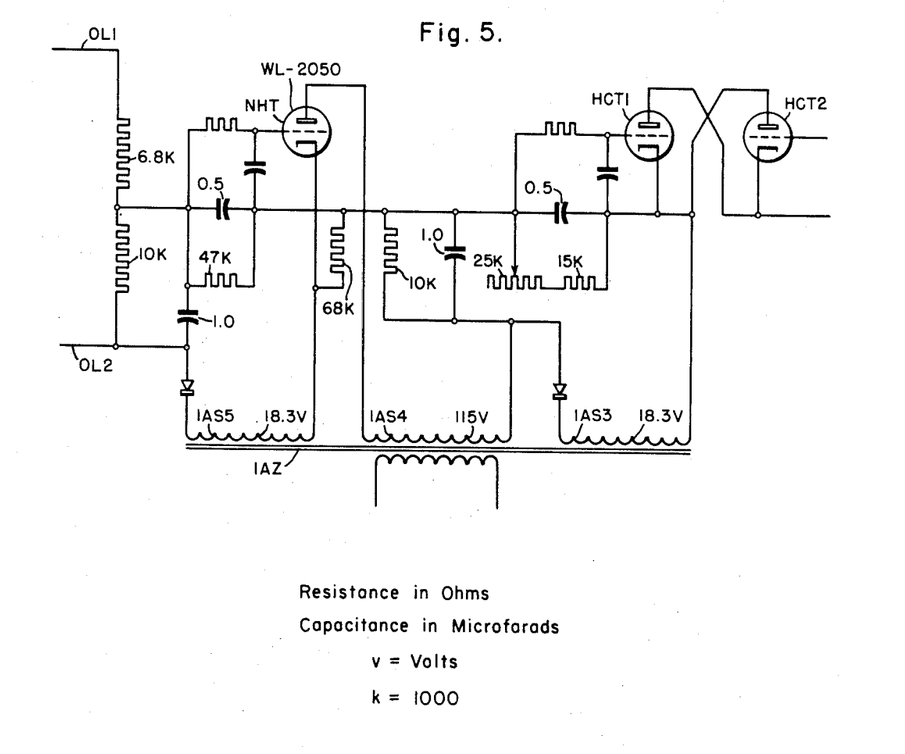
Fig. 5 is a portion of a circuit diagram similar to that shown in Fig. 3 but presenting the magnitudes of the various components included in this circuit.

The novel features considered characteristic of this invention are disclosed generally above. The invention itself, both as to its organization and its method of operation together with additional objects and advantages thereof, will be understood from the following description of specific embodiments taken in connection with the accompanying drawings, in which:

Fig. 5 is included herein for the purpose of aiding those skilled in the art in practicing this invention and not with the thought of in any respect limiting the scope of this invention.

Figure 1:
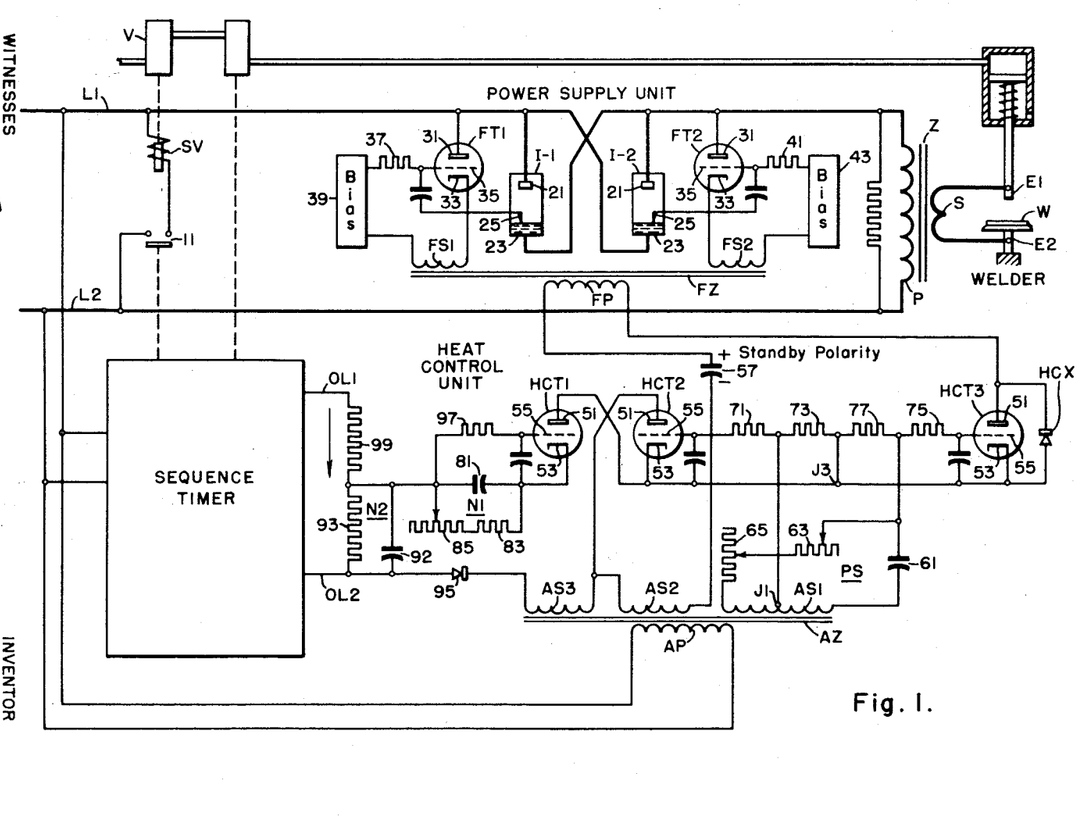
Figure 1 is a circuit diagram of an embodiment of this invention including only facilities for delaying the initiation of welding current during the first half period of a welding interval.

Description, Figure 1

The apparatus shown in Fig. 1 includes a Welder, a Power Supply Unit, a Heat Control Unit, and a Sequence Timer. This apparatus is supplied from power supply buses or conductors L1 and L2. Components which require voltage different than that available at the conductors L1 and L2 are supplied from transformer AZ, the primary AP of which is connected between conductors L1 and L2 and which has secondaries AS1, AS2, AS3.

The welder includes a pair of electrodes E1 and E2, one of which is actuable by a fluid pressure system to move into and out of engagement with work W. Welding current is supplied to the electrodes E1 and E2 and work W through a welding transformer Z, having a primary P and a secondary S. The secondary S is connected across the electrodes E1 and E2. The Welder also includes a valve V for controlling the supply of fluid to actuate the electrode E1. This valve is controlled by a solenoid SV, which is adapted to be connected between the conductors L1 and L2 on the closing of a contact 11 which is controlled from the Sequence Timer.

The Power Supply Unit includes a pair of ignitrons I-1 and I-2, each having an anode 21, a cathode 23 and an ignitor 25. The ignitrons are controlled from firing tubes FT1 and FT2, each having an anode 31, a cathode 33 and a control electrode 35. The anodes 31 of thyratrons FT1 and FT2 are each connected to an anode 21 of a corresponding ignitron I-1 and I-2. The cathodes 33 are directly connected to the ignitors 25 of the associated ignitrons.

The conduction of the firing tubes FT1 and FT2 is controlled from a firing transformer FZ, having a primary FP and secondaries FS1 and FS2. The control electrode 35 of thyratron FT1 is connected to the cathode 33 through a grid resistor 37, a blocking bias 39 and the secondary FS1; the control electrode 35 of thyratron FS2 is similarly connected through a grid resistor 41, blocking bias 43 and the secondary FS2. In the standby condition of the apparatus, the blocking bias 39, 43 is adequate to maintain thyratrons FT1 and FT2 non-conducting so that ignitrons I-1 and I-2 are also non-conducting. Potential to counteract the bias is impressed through the secondaries FS1 and FS2 during the welding interval.

The Heat Control Unit includes thyratrons HCT1, HCT2 and HCT3 and a rectifier HCX. Each of the thyratrons HCT1, HCT2 and HCT3 has an anode 51, a cathode 53 and a control electrode 55. The anodes 51 and cathodes 53 of thyratrons HCT1 and HCT2 are connected in inverse parallel. The anode 51 and cathode 53 of thyratron HCT3 are connected in inverse parallel with the rectifier HCX. The Heat Control Unit also includes a potential reversing capacitor 57. The cathodes 53 of thyratrons HCT2 and HCT3 are connected together. The anode 51 and cathode 53 of thyratron HCT2, the capacitor 57, the primary FP and the rectifier HCX are connected in series with the secondary AS2 to conduct in one direction and the anodes 51 and cathodes 53 of thyratrons HCT1 and HCT3 are similarly connected to conduct in the opposite direction. The Heat Control Unit also includes a phase shift network PS. The network PS includes a capacitor 61 and a pair of variable resistors 63 and 65. The capacitor 61 and resistors 63 and 65 are connected in series across secondary AS1. The network PS has output terminals at the junction J2 of the capacitor 61 and resistor 63 and at the intermediate tap J1 of the secondary AS1. The control electrode 55 of thyratron HCT2 is connected to the common junction J3 of the cathodes 53 through a grid resistor 71 and another resistor 73, the control electrode 55 of thyratron HCT3 through another grid resistor 75 and a fourth resistor 77. The grid resistors are of the same magnitude as are the other resistors. The junctions J1 and J2 are connected respectively to the control electrodes 55 of thyratrons HCT2 and HCT3 through the grid resistors 71 and 75. Potentials displaced in phase as determined by the setting of the network PS, are thus impressed between the control electrodes and the cathodes of thyratrons HCT2 and HCT3. These potentials are of opposite phase with respect to each other.

The Heat Control Unit also includes time-constant networks N1 and N2 and a rectifier. Network N1 includes a capacitor 81 shunted by a fixed resistor 83 and a variable resistor 85. Network N2 includes a capacitor 91 shunted by a resistor 93. The networks N1 and N2 are connected in series with a rectifier 95 and the secondary AS3 in a charging network. The network N1 is also connected between the control electrode 55 and the cathode 53 of thyratron HCT1 through a grid resistor 97. The rectifier 95 is so poled, and the impedances of the networks N1 and N2 are so related that when secondary AS3 is energized, a blocking potential is impressed between the control electrode 55 and the cathode 53 of thyratron HCT1.

The Sequence Timer may be of any type available in the art. The important property of a Sequence Timer, as far as the invention disclosed herein is concerned, is that during a so-called weld interval, it supplies current. Usually the current is supplied by rendering conducting a thyratron in the Sequence Timer during the weld interval, and the current flows during alternate half periods of the supply L1 and L2. The current during the welding interval is supplied at the output terminals OL1 and OL2 of the Sequence Timer. The flow of current as indicated by arrows is between the conductor OL1 and the conductor OL2. The arrows indicate the flow of positive current, that is, the flow of ions or holes as distinct from the flow of electrons. The terminals OL1 and OL2 are connected to supply network N2 through a voltage dividing resistor 99. The impedances of the resistor 99 and the network N2 are so related that when current is conducted through the resistor and network N2, network N2 is charged to block conduction through the charging network from secondary AS3.

Stand-by, Figure 1

The condition of the apparatus in stand-by and the operation of the apparatus will be explained with the reference to Fig. 3 which includes four graphs. In graph a the anode potential on the weld thratron (not shown) of the Sequence Timer is plotted vertically and time horizontally. The half periods during which the thyratron is conducting is represented by the shading under the half sign waves. (Note that when the thyratron is conducting its anode potential is equal to the arc drop potential and is not high as shown. The presentation in graph

Figure 3:
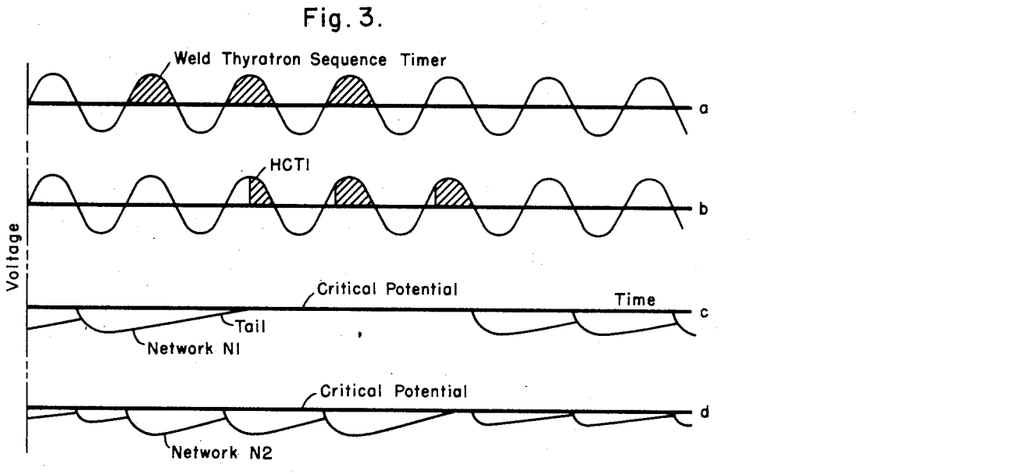
Fig. 3 is a graph illustrating the operation of the apparatus shown in Fig. 1.

*a* of Fig. 3 is used for clarity.) In graph *b*, the anode potential on thyratron HCT1 is plotted vertically and time horizontally. Again the shading represents the intervals during which thyratron HCT1 is conducting. In graph *c*, the potential on the capacitor 81 of network N1 is plotted vertically and time horizontally. The base is as indicated the critical potential and the capacitor potential is plotted as the potential of the control electrode of thyratron HCT1 with reference to the critical potential of this thyratron. In graph *d*, the potential on the capacitor 91 of network N2 is plotted vertically and time horizontally. The portion of Fig. 3 on the extreme left represents the condition of the apparatus shown in Fig. 1 during stand-by and during operation before the weld interval of the Sequence Timer starts.

In the stand-by condition of the apparatus, the disconnects or circuit breakers, through which the conductors L1 and L2 are connected through the supply, are closed and conductors L1 and L2 are energized. Transformer AZ is then energized, and potential is supplied by secondaries AS1, AS2 and AS3. Initially thyratron HCT2 is capable of being rendered conducting at an instant in the periods of the supply determined by network PS. This thyratron then conducts current in a circuit extending from the left-hand terminal of the secondary AS2 through the anode 51 and cathode 53 of thyratron HCT2, the rectifier HCX, the primary FP, and the capacitor 57 to the remaining terminal of the secondary AS2. Once the capacitor 57 is charged, the flow of further current in this network is blocked, and the network remains quiescent until the capacitor 57 is permitted to discharge. The capacitor can discharge through the thyratrons HCT1 and HCT3. The conductivity of thyratron HCT1 is determined by the conditions of networks N1 and N2, and this, in turn, is determined by the condition of the Sequence Timer.

Now in the stand-by condition of the apparatus, the Sequence Timer is quiescent, and its weld thyratron is non-conducting so that there is no flow of current between terminals OL1 and OL2. Network N2 is then uncharged. With network N2 uncharged, secondary AS3 supplies current in the charging network including network N1, network N2 and the rectifier and network N1 is charged to a potential such that thyratron HCT1 is maintained non-conducting. The polarity of secondary AS3 is such with reference to the polarity of the secondary AS2 that network N1 is charged during the half periods during which the anode-cathode potential of thyratron HCT1 is negative. The network N1 retains the negative potential built up in it during the subsequent half period during which the anode-cathode potential of thyratron HCT1 is positive. This is represented in the left-hand portions of graphs 3*b* and 3*c*. With thyratron HCT1 non-conducting, the capacitor 57 in the Heat Control Unit cannot discharge, and there is no flow of current through the primary FP. Thyratrons FT1 and FT2 are then non-conducting as are ignitrons I–1 and I–2, and there is no flow of current through the primary P.

Further, since the Sequence Timer is quiescent, the contact 11 in series with solenoid SV is open, the valve V is closed and electrode E1 is retracted from electrode E2.

*Operation, Figure 1*

In preparing for the operation of the apparatus, the variable resistor 63 is set so that the heat control setting cannot cause conduction of the ignitrons I–1 and I–2 earlier than the angle corresponding to the power factor of the apparatus for the material being welded, and the resistor 65 is set for the desired heat control.

In the operation of the apparatus, the work W is disposed on electrode E2, and a starting switch is actuated to start the timing out of the Sequence Timer. As the Sequence Timer times out, the contact 11 in series with solenoid SV is closed, energizing the solenoid and opening the valve V. Electrode E1 then engages the work W under pressure.

After the electrode E1 is properly seated on the work W, the weld thyratron of the Sequence Timer is rendered conducting. Current then flows between terminals OL1 and OL2 to charge network N2. The charging potential on network N2 is represented by the second loop of Fig. 3*d*. This potential is adequate to block the current flow through the charging network. Since it is no longer charged, network N1 discharges as represented by the tail of the first loop of Fig. 3*c*. The time constant of network N1 is such that it discharges in a time interval of about one and three quarter periods of the supply from the beginning of the charging to a point at which the critical potential of thyratron HCT1 is exceeded and the thyratron is conditioned to contact.

Thyratron HCT1 is connected in a circuit extending from the positive charged plate of the capacitor 57 through the primary FP, the anode 51 and cathode 53 of thyratron HCT3, the anode and cathode of thyratron HCT1, the secondary AS2 to the negative plate of the capacitor 57. Thyratron HCT1, when conditioned to conduct, cannot conduct until thyratron HCT3 conducts, and thyratron HCT3 cannot conduct until thyratron HCT1 can conduct. Now the conduction of thyratron HCT3 is controlled by the phase shift network PS, and this network is usually set so that thyratron HCT3 can conduct relatively early in each of the half periods during which its anode-cathode potential is positive, but during the first of the half periods during which thyratron HCT1 can conduct, the latter can conduct only at an instant of the order of one quarter period after the beginning of the half period. Thus, during this first half period, thyratrons HCT1 and HCT3 conduct beginning at an instant about one quarter period after the beginning of the half period. The flow of current charges capacitor 57 in a short time interval and thus terminates the current.

At the instant when current flows through the primary FP, it induces current in the secondaries FS1 and FS2 to counteract the bias on thyratrons FT1 and FT2. Thyratron FT1 then conducts to fire ignitron I–1 so that current flows through the primary P, and welding current is supplied to the work through the transformer Z beginning about one quarter period after the beginning of the half period. During the succeeding half period, current can flow when thyratron HCT2 can conduct, and this is determined by the setting of the network PS and is early in the half period of the supply. Current now flows from the now positive plate of the capacitor 57 through the secondary AS2, the anode and cathode of thyratron HCT2, the rectifier HCX, the primary FP to the now negative plate of the capacitor. In this case, again the capacitor 57 is charged in a short time interval by the pulse transmitted through the primary FP, and by reason of the charge on the capacitor 57 the conduction of thyratron HCT2 is terminated. The pulse transmitted through the primary FP induces potential in the secondary FS2 rendering thyratron FT2 conducting, which, in turn, renders ignitron I–2 conducting. Another current pulse now flows through the primary P and through work W. Now the weld thyratron conducts again, as represented by the second shaded half cycle from the left in Fig. 3*a*, recharging network N2 so that the charging of network N1 is prevented, and the latter continues to remain discharged. Since network N1 is now discharged, thyratron HCT1 can conduct at the beginning of the third half period following the start of the welding, but thyratron HCT3 prevents this conduction until it is rendered conducting in accordance with the setting of network PS. When thyratron HCT3 is rendered conducting, another current pulse flows through primary FP and thyratron FT1, and ignitron I–1 is again rendered conducting to the supply current work W. This current pulse through primary FP is followed by a pulse of opposite polarity through the primary FP, through HCT2 and rectifier HCX. Current again flows through the primary P so that the second cycle of welding current is supplied. As represented in Fig. 3, the weld time or the Sequence Timer is such that the weld thyratron conducts during a third period. The above-described process is then repeated, and another full cycle of current flows through the work W.

During the succeeding period, the weld thyratron of the Sequence Timer does not conduct. Network N2 then is not recharged and discharges during the half period when the weld thyratron would have otherwise conducted. During the subsequent half period as represented in the right hand portion of Fig. 3c, the network N1 is again charged preventing further conduction of thyratron HCT1. During this half period, a pulse of current was transmitted through the primary FP, the thyratron HCT2 and the rectifier HCX to charge the capacitor 57 to its initial polarity. The Heat Control Unit is now set in its initial condition, and the flow of welding current is terminated. The timing out of the Sequence Timer continues, and eventually the electrode E1 is disengaged from the electrode E2 by the opening of the contact 11 and the apparatus is completely reset.

It is seen that in the operation of the apparatus, welding current flowed during three periods of the supply. During the first half period of this interval, the welding current was initiated at an instant late in this half period. Because of this, the saturation of the highly magnetizable transformer was avoided.

Figure 2:
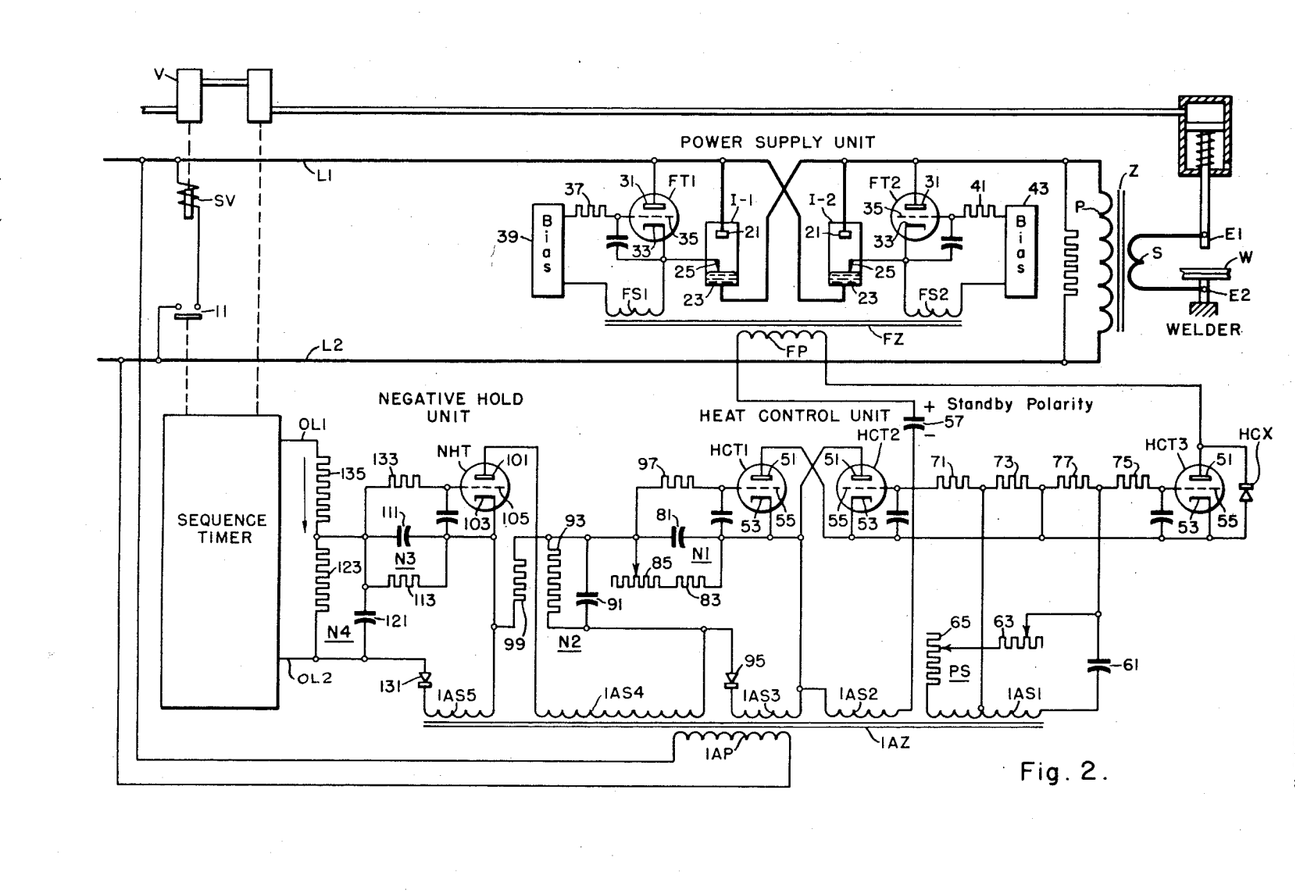
Fig. 2 is a circuit diagram of a modification of this invention including the facilities of the Fig. 1 modifications and in addition negative hold provisions.

Description, Figure 2

The apparatus shown in Fig. 2 differs from the Fig. 1 apparatus in the fact that a Negative Hold Unit is interposed between the Sequence Timer and the Heat Control Unit, both the Sequence Timer and the Heat Control Unit being the same as in the Fig. 1 apparatus. The apparatus shown in Fig. 2, is supplied from conductors L1 and L2 like the apparatus shown in Fig. 1. Voltages different from that available between L1 and L2 are derived from a transformer 1AZ having a primary 1AP and secondaries 1AS1, 1AS2, 1AS3, 1AS4 and 1AS5. The secondaries 1AS1, 1AS2 and 1AS3 perform the same functions as the secondaries AS1, AS2 and AS3 in the Fig. 1 apparatus. The secondaries 1AS4 and 1AS5 supply the Negative Hold Unit.

The Negative Hold Unit includes a thyratron NHT having an anode 101, a cathode 103 and a control electrode 105, a pair of time-constant networks N3 and N4 and a rectifier. Networks N3 and N4 each include a capacitor 111 and 121 shunted by a resistor 113 and 123. Anode-cathode potential is supplied to the thyratron NHT through the secondary 1AS4, this secondary being connected in series with the anode and cathode through the voltage dividing resistor 99 and the network N2. When thyratron NHT conducts, it charges network N2 so as to block current flow through charging network 1AS3. Networks N3 and N4 are connected in a charging circuit in series with a rectifier 131 and the secondary 1AS5. Network N3 is also connected between the control electrode 105 and the cathode 103 of thyratron NHT through a grid resistor 133. The rectifier 131 in this charging network is so poled, and the impedances of the networks N3 and N4 are so related, that when network N3 is charged, it blocks the conduction of thyratron NHT.

Network N4 is connected between conductors OL1 and OL2 of the Sequence Timer through a voltage dividing resistor 135 to be charged by the conductor of the weld thyratron of the Sequence Timer. Network N3 is set to time out in a time interval such that the desired negative hold interval may be produced. To achieve the highest precision in the presence of line voltage fluctuations and related effects, it is desirable that network N3 should have a time constant of no more than one or at most two periods of the supply. Where a longer time constant is necessary, because facilities for a longer negative hold time are desirable, several Negative Hold Units may be cascaded between the Sequence Timer and the Heat Control Unit, each Unit adding a period or two to delay between the rendering conducting of the weld thyratron of the Sequence Timer and the energization of the Heat Control Unit.

Stand-by, Figure 2

Figure 4:
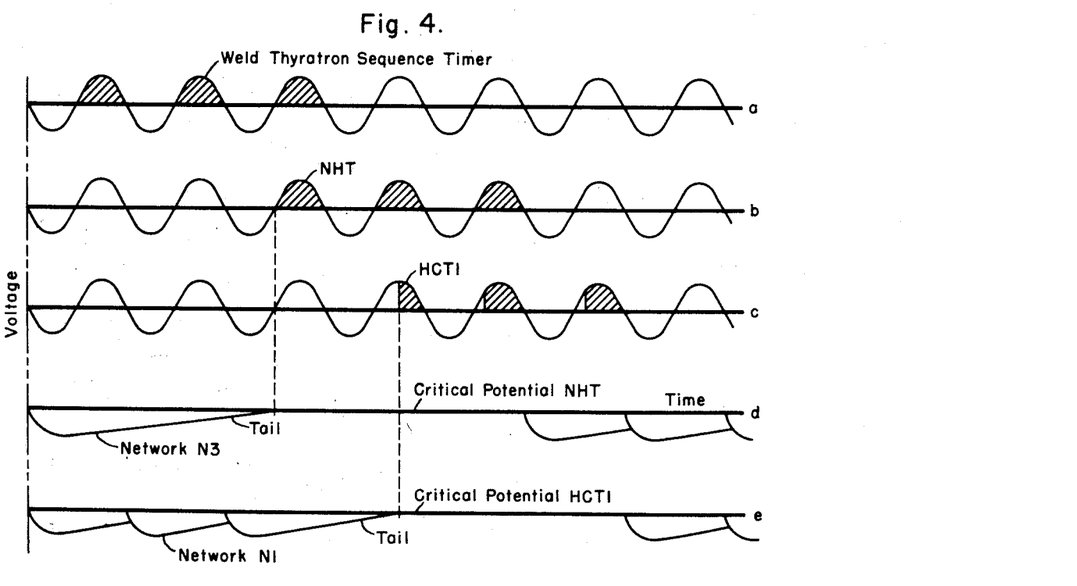
Fig. 4 is a graph illustrating the operation of the apparatus shown in Fig. 2.

The stand-by condition and the operation of the apparatus shown in Fig. 2 will be explained with reference to Fig. 4. In Fig. 4, graph *a* presents the voltage on the weld thyratron of the Sequence Timer as a function of time, the shaded areas representing the half periods during which this weld thyratron is conducting. Graph *b* correspondingly represents the anode potential on thyratron NHT as a function of time, and graph *c* the anode potential on thyratron HCT1 as a function of time. Graph *d* represents the potential on network N3 with respect to the critical potential of NHT as a function of time, and graph *e* correspondingly represents the potential on network N1.

In the stand-by condition of the apparatus, the Sequence Timer is quiescent, and current is not transmitted between the terminals OL1 and OL2. Network N4 is then not charged to a blocking potential, and network N3 is charged from secondary 1AS5 so as to block thyratron NHT. Since thyratron NHT is blocked, network N2 is not charged to a blocking potential, and network N1 is charged to block thyratron HCT1. The Heat Control Unit is then in condition as described in connection of Fig. 1 in which the capacitor 57 is charged to a polarity such that it can conduct through thyratrons HCT1 and HCT3 when the latter are rendered conducting.

Operation, Figure 2

In operation, after network PS is set and the work W is properly positioned, the starting switch is closed, and pressure is applied to the work W, and the weld thyratron of the Sequence Timer is rendered conducting. At the same time, the timing out of the weld time of the Sequence Timer starts. When the weld time times out, the weld thyratron of the Sequence Timer is rendered non-conducting, and the timing out of the hold time starts. The start of the hold time thus depends on the timing in the Sequence Timer and is not affected by the timing produced by the Negative Hold Unit.

When the weld thyratron of the Sequence Timer is rendered conducting, network N4 is charged blocking the charging network and permitting network N3 to discharge as represented by the tail of the loop in Fig. 4d. It is seen that when permitted to discharge by the conduction of the weld thyratron of the Sequence Timer, network N3 discharges in a time interval of the order of two and one half periods following the start of the charging of this network. The time of discharge of the network N3, after the weld thyratron of the Sequence Timer starts conducting, is two full periods. During this time the weld time of the Sequence Timer is timing out. The weld time may be as shown of the order of three periods. When the weld time has timed out, the hold time starts timing out. The hold time will then start three periods following the start of the weld time and one period following the timing out of the network N3.

When network N3 times out, thyratron NHT is rendered conducting charging network N2 and preventing the further charging of network N1 so that the latter discharges. The timing out of the latter is represented by the tail on the third loop in Fig. 4e. It is seen to take place in a time interval of the order of one and one quarter periods after the start of conduction of thyratron 1HT. When network N1 has timed out thyratrons HCT1 and HCT3 are rendered conducting, and the flow of welding current is initiated as described in connection in Fig. 1. In the situation represented by Fig. 4 the flow of welding current starts one quarter period after the weld time has timed out, and that is roughly one quarter period after the start of the hold time.

Thyratron NHT will continue to conduct so long as network N3 is maintained discharged, and this time is determined by the timing out of network N4. Network N4 may be set to time out in an interval of the order of two and one half periods after the weld thyratron of the Sequence Timer conducts for the last, that is the third, time. Under such circumstances, network N3 remains uncharged to permit thyratron NHT to conduct during three succeeding positive half periods as shown in Fig. 4b. Thyratron HCT1 then conducts during three succeeding positive half periods, and three cycles of welding current are supplied.

While the welding current is being supplied, the hold time times out, and the fluid pressure system is actuated to cause the electrode E2 to be disengaged from the work. The hold time may be so set that the disengagement starts before the welding current stops flowing. After the disengagement of the electrode from the work, the Sequence Timer times out completely. By this time network N4 has timed out so that network N3 is charged blocking thyratron NHT. Network N2 has also timed out permitting network N1 to charge to block thyratron HCT. The system is then reverted to its initial position.

Conclusion

It is seen that in accordance with the invention, apparatus is provided which includes facilities for delaying the flow of welding current during the first half period to a welding transformer of the highly magnetizable type and for producing the negative hold feature. These facilities incorporate a simple novel thyratron circuit which is used both to produce the delayed supply of the welding current during the first half period and the negative hold.

While preferred embodiments of this invention have been disclosed, many modifications thereof are feasible. The invention is therefore not to be restricted except insofar as necessitated by the spirit of the prior art.

I claim as my invention:

1. Apparatus for controlling the supply of current from an alternating source to a welding transformer particularly of the type having a highly magnetizable core comprising in combination a sequence timer including means for supplying current during a weld interval; a heat control unit including an electric discharge device, means so connecting said device in said unit that when said device is rendered conducting during a period of said potential it conditions said unit to supply heat control pulses during each half period of said period, each pulse beginning at a predetermined instant during its periods, the first of said pulses being initiated at an instant later than the instant when said device is rendered conducting, and means for maintaining said device non-conducting in the stand-by condition of said apparatus; means responsive to said current and connected to said maintaining means for rendering said device conducting when said current is supplied, said maintaining means including means operative only during the first half period of conduction of said device for delaying the conduction of said device until late in said first half period; and means to be connected to said transformer responsive to each of said pulses for supplying a half cycle of current to said transformer for each said pulse, said half cycle of current being initiated at said predetermined instant for said pulse.

2. A heat control unit including an electric discharge device having an anode, a cathode and a control electrode, means so connecting said anode and cathode in said unit that when it is rendered conducting it conditions said unit to supply heat control pulses, a first time constant network, a second time constant network, terminals for supplying an alternating potential, a rectifier, means connecting in a series charging network; said first network, said second network, said terminals and said rectifier, means connecting said first network between said control electrode and said cathode, said rectifier being so poled and the impedances of said first and second networks being so related that in the absence of externally impressed potential across said second network, a blocking potential for said device is impressed across said first network when potential is supplied to said terminals, and means for impressing an external potential across said second network blocking the flow of current through said charging network, said second network having a time constant such that when said potential is impressed thereacross during a half period, the flow of current through said charging network is blocked during the subsequent half period and said first network having a time constant such that when the flow of current is blocked through said charging network during a half period just after said first network is charged said first network permits conduction of said device at an instant late in the subsequent half period.

3. A heat control unit including an electric discharge device having an anode, a cathode and a control electrode, means so connecting said anode and cathode in said unit that when it is rendered conducting it conditions said unit to supply heat control pulses, a first time constant network, a second time constant network, terminals for supplying an alternating potential, a rectifier, means connecting in a series charging network, said first network, said second network, said terminals and said rectifier, means connecting said first network between said control electrode and said cathode, said rectifier being so poled and the impedances of said first and second networks being so related that in the absence of externally impressed potential across said second network, a blocking potential for said device is impressed across said first network when potential is supplied to said terminals, and means for impressing an external potential across said second network blocking the flow of current through said charging network, said second network having a time constant such that when said potential is impressed thereacross during a half period, the flow of current through said charging network is blocked during the subsequent half period and said first network having a time constant such that when said network is charged during a half period and permitted to discharge it discharges to potential such as to permit said device to conduct in a time interval of the order of one and three quarter periods after the beginning of said half period.

4. Apparatus for controlling the supply of current from an alternating source to a welding transformer particularly of the type having a highly magnetizable core comprising in combination a sequence timer including means for supplying current during a weld interval; a heat control unit including an electric discharge device, means so connecting said device in said unit that when said device is rendered conducting during a period of said potential it conditions said unit to supply heat control pulses during each half period of said period, each pulse beginning at a predetermined instant during its periods, the first of said pulses being initiated at an instant later than the instant when said device is rendered conducting, and means for maintaining said device non-conducting in the stand-by condition of said apparatus; means responsive to said current and connected to said maintaining means for rendering said device conducting when said current is applied, said responsive means including means for delaying the instant when said device is rendered conducting by a predetermined time interval after the instant when said current starts to flow and said maintaining means including means operative only during the first half period of conduction of said device for delaying the conduction of said device until late in said first half period; and means to be connected to said transformer responsive to each of said pulses for supplying a half cycle of current to said transformer for each said pulse, said half cycle of current being initiated at said predetermined instant for said pulse.

5. In combination terminals for supplying an alternating potential, output means, a capacitor, a first electric discharge device, a second electric discharge device, a third electric discharge device, each said device having an anode, a cathode and a control electrode, current rectifying means, means connecting said anodes and cathodes of said first and second devices in inverse parallel, means connecting said anode and cathode of said third device in inverse parallel with said rectifying means, means connecting in series, said terminals, said output means, said capacitor, said rectifying means and said anode and cathode of said second device with said rectifying means and said last named anode and cathode poled to conduct current of the same polarity, means for deriving a control alternating potential displaced in phase with reference to said supplied alternating potential, means for impressing said control potential between the control electrodes and the cathodes of said second and third devices, the control potential between said control electrode and cathode of said second device being in opposite phase to the control potential between said control electrode and cathode of said third device, additional terminals for supplying alternating potential of the same frequency as is supplied by said first-named terminals, a first time-constant network, a second time-constant network, second rectifying means, means connecting in series in a charging network, said additional terminal, said second rectifying means, said first network and said second network, means connecting said first network between said control electrode and said cathode of said first device, said second rectifying means being so poled and the impedances of said first and second networks being so related that when potential is supplied to said additional terminals a blocking potential is impressed on said first network, and means connected to said second network for impressing a potential thereon to block the flow of current through said charging network.

6. Apparatus for controlling the supply of current from an alternating source to welding means, comprising in combination a sequence timer having means for supplying control current during a weld interval, a heat control unit for supplying pulses, means connected to said unit and to be connected to said welding means and responsive to said pulses for causing current to flow to said welding means, means connected to said unit for blocking the supply of said pulses in the quiescent condition of said apparatus, and timing means connected to said blocking means and responsive to said control current for counteracting said blocking means a predetermined time interval after said control current is initiated.

7. In combination an electric discharge device having a control electrode and an associated principal electrode, a first time-constant network, a second time-constant network, a rectifier, terminals for supplying an alternating potential, means connecting in series in a charging network said terminals, said first network, said second network and said rectifier, means connecting said first network between said control electrode and said principal electrode, said rectifier being so poled and the impedances of said first and second networks being such that when potential is supplied at said terminals a blocking potential is impressed between said control electrode and said cathode, and means connected to said second network for impressing a potential thereon for blocking the flow of current through said charging network.

8. In combination a first electric discharge device, a second electric discharge device, each said device having an anode, a cathode and a control electrode, a first time-constant network, a second time-constant network, a third time-constant network, a fourth time-constant network, first terminals for supplying an alternating potential, second terminals for supplying an alternating potential, third terminals for supplying an alternating potential, a first rectifier, a second rectifier, means connecting in series in a first charging network said first terminals, said first rectifier, said first network and said second network, means connecting said first network between the control electrode and the cathode of said first device, said first rectifier being so poled and the impedances of said first and second networks being so related that when potential is supplied between said first terminals said first device is blocked by said first network, means connecting in series in a second charging network said second terminals, said second rectifier, said third network and said fourth network, means connecting said third network between the control electrode and cathode of said third device, said second rectifier being so poled and the impedances of said second and third networks being so related that when potential is supplied by said second terminals said second device is blocked by said third network, means connected to said first network for impressing a potential thereon to block flow of current in said first charging network, and means connecting in a series current said third terminals, said anode and cathode of said first device and said fourth network, said last-named anode and cathode being so poled that when said first device is conducting the flow of current in said second charging network is blocked.

9. In combination an electric discharge device having a control electrode and an associated principal electrode, a first time-constant network, a second time-constant network, a rectifier, terminals for supplying an alternating potential, means connecting in series in a charging network said terminals, said first network said second network and said rectifier, means connecting said first network between said control electrode and said principal electrode, said rectifier being so poled and the impedances of said first and second networks being such that when potential is supplied at said terminals a blocking potential is impressed between said control electrode and said cathode, a second electric discharge device including an anode and a cathode, and means including said anode and cathode connected to said second network for impressing a potential thereon for blocking the flow of current through said charging network.

10. High speed welding apparatus for welding work with energy derivable from an alternating-current source, said apparatus including a welder having welding electrodes and means connected to said electrodes to be actuated to cause said electrodes to engage said work under pressure, a power supply unit to be connected to said electrodes and to said source to be energized to supply welding current from said source to said electrodes, energizing means connected to said unit to be actuated to energize said unit, a sequence timer having a squeeze timing component, a weld timing component, a hold timing component and means for initiating the operation of said timer, the timing out of said squeeze, weld and hold components, respectively, being initiated in succession and said components respectively timing out in succession once the timing out of the said sequence timer is initiated, and said sequence timer delivering a signal during the timing out of said weld component, means for connecting said sequence timer to said work engaging means and actuable on the initiation of the timing out of said squeeze component for actuating said work engaging means to cause said electrodes to engage said work during the timing out of said squeeze component and to cause said electrodes to disengage said work on the timing out of said hold component, a negative-hold timing unit, means connecting said negative-hold unit to said sequence timer to be actuated to time out by said signal produced during the timing out of said weld component, and means connecting said negative-hold unit to said energizing means to actuate said energizing means to energize said power supply unit on the timing out of said negative-hold unit.

11. High speed welding apparatus for welding work with energy derivable from an alternating-current source, said apparatus including a welder having welding electrodes and means connected to said electrodes to be actuated to cause said electrodes to engage said work under pressure, a power supply unit to be connected to said electrodes and to said source to be energized to supply welding current from said source to said electrodes, said power supply unit being energizable during each half period of said source by a pulse impressed thereon during said half period and at the instant when said pulse is impressed, a heat control unit connected to said power supply unit to be actuated to supply said pulses to energize said power supply unit during half periods of said source at predetermined instants in each of said half periods, a sequence timer having a squeeze timing component, a weld timing component, a hold timing component and means for initiating the operation of said sequence timer, the initiation of the timing out and the timing out of said squeeze, weld and hold components, respectively, taking place in succession once the timing out of the sequence timer is initiated, and said sequence timer delivering a signal during the timing out of said weld component, means for connecting said sequence timer to said work engaging means and actuable on the initiation of the timing out of said squeeze component for actuating said work engaging means to cause said electrodes to engage said work during the timing out of said squeeze component and for causing said electrodes to disengage said work on the timing out of said hold component, a negative-hold timing unit, means connecting said negative-hold unit to said sequence timer to be actuated to time out by the signal produced during the timing out of said weld component, and means connecting said negative-hold unit to said heat control unit to actuate said energizing means to supply pulses to energize said power supply unit on the timing out of said negative-hold unit.

12. High speed welding apparatus for welding work with energy derivable from an alternating-current source, said apparatus including a welder having welding electrodes and means connected to said electrodes to be actuated to cause said electrodes to engage said work under pressure, a power supply unit to be connected to said electrodes and to said source to be energized to supply welding current from said source to said electrodes, energizing means connected to said unit to be actuated to energize said unit, a sequence timer having a squeeze timing component, a weld timing component, a hold timing component and means for initiating the operation of said timer, the timing out of said squeeze, weld and hold components, respectively being initiated in succession and said components respectively timing out in succession once the timing out of the said sequence timer is initiated, and said sequence timer delivering a signal during the timing out of said weld component, means for connecting said sequence timer to said work engaging means and actuable on the initiation of the timing out of said squeeze component for actuating said work engaging means to cause said electrodes to engage said work during the timing out of said squeeze component and to cause said electrodes to disengage said work on the timing out of said hold component, a negative-hold timing unit, said negative-hold unit having an off timing component and an on timing component, means setting said negative-hold unit so that during standby, said off timing component is conditioned to time out, means connecting said negative-hold unit to said sequence timer so that said off timing component is caused to time out by said signal produced during the timing out of said weld component and while said signal is impressed and said on timing component is set by said signal to time out after said signal is interrupted, means connecting said negative-hold unit to said energizing means to actuate said energizing means to energize said power supply unit on the timing out of said negative-hold unit, said actuation to continue until said on timing component times out.

13. Apparatus for controlling the supply of current from an alternating source to welding means, comprising in combination a sequence timer having means for supplying control current during a weld interval, a heat control unit for supplying pulses, means connected to said unit and to be connected to said welding means and responsive to said pulses for causing current to flow to said welding means, means connected to said unit for blocking the supply of said pulses in the quiescent condition of said apparatus, and timing means connected to said blocking means and responsive to said control current for counteracting said blocking means a first predetermined time interval after said control current is initiated, and for maintaining said blocking means counteracted a second predetermined time interval after said control current is interrupted.

14. High speed welding apparatus for welding work with energy derivable from an alternating-current source, said apparatus including a welder having welding electrodes and means connected to said electrodes to be actuated to cause said electrodes to engage said work under pressure, a power supply unit to be connected to said electrodes and to said source to be energized to supply welding current from said source to said electrodes, energizing means connected to said unit to be actuated to energize said unit, a sequence timer having a squeeze timing component, a weld timing component, a hold timing component and means for initiating the operation of said timer, the timing out of said weld and hold components being initiated after the timing out of the squeeze component is initiated and said squeeze and weld and hold components timing out in succession once the timing out of the said sequence timer is initiated, and said sequence timer delivering a signal during the timing out of said weld component, means for connecting said sequence timer to said work engaging means and actuable on the initiation of the timing out of said squeeze component for actuating said work engaging means to cause said electrodes to engage said work during the timing out of said squeeze component and to cause said electrodes to disengage said work on the timing out of said hold component, a negative-hold timing unit, means connecting said negative-hold unit to said sequence timer to be actuated to time out by said signal produced during the timing out of said weld component, and means connecting said negative-hold unit to said energizing means to actuate said energizing means to energize said power supply unit on the timing out of said negative-hold unit.

References Cited in the file of this patent

UNITED STATES PATENTS

| 1,939,462 | Ramsay | Dec. 12, 1933 |
| 2,114,828 | Bedford | Apr. 19, 1938 |
| 2,239,053 | Roby | Apr. 22, 1941 |
| 2,295,601 | Overbeck | Sept. 15, 1942 |
| 2,390,981 | Bivens | Dec. 18, 1945 |
| 2,639,361 | Hartwig et al. | May 19, 1953 |
| 2,653,209 | Hartwig et al. | Sept. 22, 1953 |
| 2,813,245 | Shipman et al. | Nov. 12, 1957 |